United States Patent [19]

Chevereau

[11] Patent Number: 4,961,897

[45] Date of Patent: Oct. 9, 1990

[54] SHOCK ABSORBING DRIVE MECHANISM FOR NUCLEAR REACTOR ABSORBING BARS

[75] Inventor: Gérard Chevereau, Le Raincy, France

[73] Assignee: Framatome, Courbevoie, France

[21] Appl. No.: 308,500

[22] Filed: Feb. 10, 1989

[30] Foreign Application Priority Data

Feb. 11, 1988 [FR] France ................................ 88 01643

[51] Int. Cl.5 .............................................. G21C 7/20
[52] U.S. Cl. .................................................. 376/234
[58] Field of Search ................. 376/234, 225, 230, 231

[56] References Cited

U.S. PATENT DOCUMENTS

| | | | |
|---|---|---|---|
| 2,855,899 | 10/1958 | Beaty | 376/234 |
| 2,994,655 | 8/1961 | Taylor, Jr. | 376/230 |
| 3,364,120 | 1/1968 | Winders et al. | 376/230 |
| 3,406,093 | 10/1968 | Paratesi et al. | 376/230 |
| 3,527,670 | 9/1970 | Winders | 376/230 |
| 3,762,994 | 10/1973 | Kunzel | 376/234 |
| 4,019,954 | 4/1977 | Giordano et al. | 376/234 |
| 4,024,018 | 5/1977 | Barnes | 376/230 |
| 4,035,230 | 7/1977 | Bevilacqua | 376/230 |
| 4,082,610 | 4/1978 | Matthews | 376/230 |
| 4,752,434 | 6/1988 | Savary | 376/234 |

FOREIGN PATENT DOCUMENTS

| | | | |
|---|---|---|---|
| 0003077 | 2/1965 | Japan | 376/234 |
| 0016918 | 9/1966 | Japan | 376/234 |
| 0154388 | 9/1984 | Japan | 376/234 |

Primary Examiner—Harvey E. Behrend
Attorney, Agent, or Firm—Pollock, Vande Sande & Priddy

[57] ABSTRACT

A drive mechanism for a neutron absorbing bar of a liquid cooled nuclear reactor has a drive shaft movable within upper internals and a shock absorber. The shock absorber has a hydraulic cylinder arranged to bear on the upper internals, formed with a bore comprising an upper portion of larger diameter provided with discharge holes spaced longitudinally along the bore and with a lower portion of smaller diameter, a piston, movable within and along the cylinder, having a diameter corresponding to that of the upper portion and defining a shock absorbing chamber with the upper portion, the chamber having exhaust means comprising the discharge holes located to be progressively covered by the piston during downward movement thereof within the cylinder, and a resetting spring biasing the piston towards a top position where it uncovers the discharge holes. The shaft passes through the piston and is arranged for forcing the piston down into the cylinder upon downward movement of the shaft in the upper internals beyond a predetermined level.

3 Claims, 2 Drawing Sheets

FIG.2.
FIG.3.
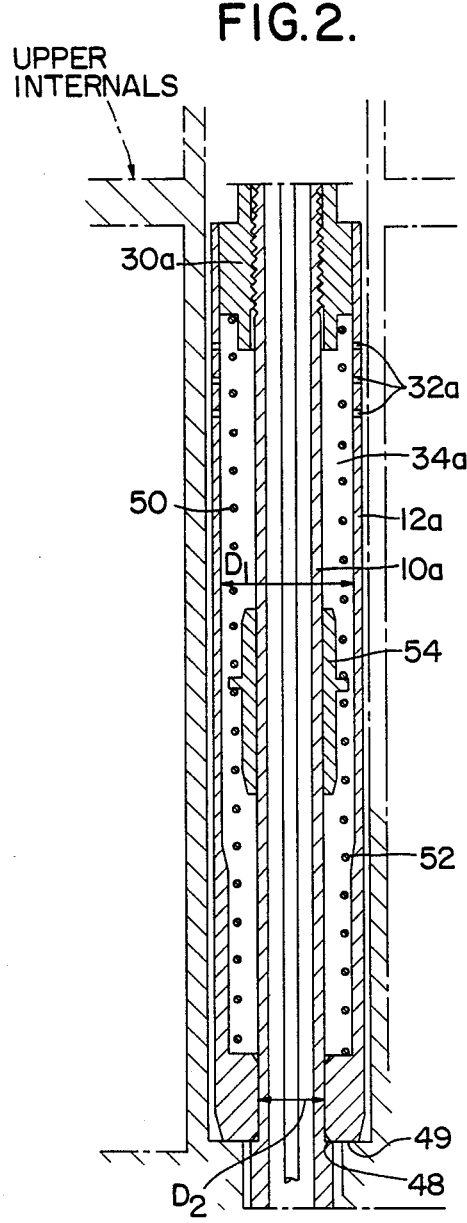
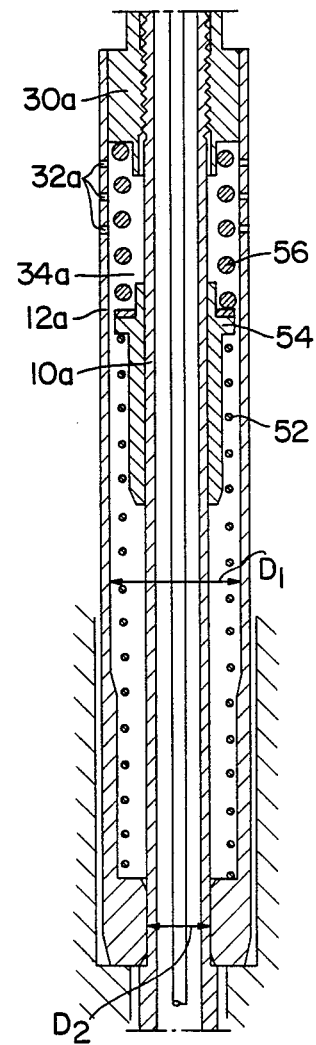

SHOCK ABSORBING DRIVE MECHANISM FOR NUCLEAR REACTOR ABSORBING BARS

BACKGROUND OF THE INVENTION

1. Field of the Invention

The invention relates to drive mechanisms for controlling vertically movable bars in liquid-cooled nuclear reactors. It particularly relates to a mechanism comprising a rod supporting the bar and movable vertically in the fixed internal equipment of the reactor and a device for absorbing the shock of the fall of the rod, with hydraulic cylinder and a piston. It is particularly, although not exclusively, for use in pressurized water moderated and cooled reactors.

2. Prior Art

Drive mechanisms of the above-defined type have been used in nuclear reactors. The bar is generally formed of a "spider" with arms radiating from a pommel and absorbent rods fixed to the arms and containing neutronic poison. Movement of the bars makes it possible to control the reactivity in the core of the reactor. For an emergency shutdown of the reactor, all bars are inserted simultaneously by releasing their drive mechanisms so that the bars fall under the action of their own weight. The purpose of the shock absorbing device is to dampen the shock when the pommel comes into abutment against the upper core plate of the reactor or against the upper end piece of the fuel assembly with which the bar is associated.

Most shock absorbing devices have insufficient efficiency and/or oppose an excessive pressure loss to the flow of the cooling fluid. Referring to EP-A-159,509 for example, a control bar has a shock absorbing device consisting of a cylinder formed in the pommel and in which slides a piston biased into a downward projecting position by resilient means contained in the cylinder. Braking by compression of the spring and throttling of the liquid driven out of the cylinder through the clearance between the piston and cylinder varies during the stroke, which adversely affects the efficiency; the volume of the shock absorber must remain small, which makes it impossible to give it a long stroke.

SUMMARY OF THE INVENTION

It is an object of the invention to provide a drive mechanism with a shock absorbing device which has increased braking efficiency for a given stroke of the piston and resets of the device.

To this end, there is provided a mechanism having a cylinder which is carried by the upper internals and comprises an upper portion of large diameter having discharge holes spaced apart longitudinally and a lower portion of small diameter. The drive shaft passes through a piston having a diameter corresponding to that of said upper portion and defining with a shock absorbing chamber with the large diameter upper portion of the cylinder. Liquid is forced out of the chamber through the discharge holes until they are covered by the piston during the downward movement thereof. A resetting spring biases the piston in the cylinder towards a high position where it uncovers the discharge holes. The shaft is arranged for driving the piston into the cylinder when it moves down in the upper internals below a predetermined level.

In a first embodiment, the cylinder is removably fixed in the upper internals. The piston has a sliding fit in the cylinder, the shaft comprising a swelling forming a hammer intended to strike the piston when the shaft, in its downward movement, reaches the high position of the piston.

In another embodiment, the cylinder and the shaft are provided with cooperating means permitting the shaft to raise the cylinder The upper internals comprise abutment means for receiving the cylinder and retaining it when the rod, in its downward movement, reaches a predetermined level.

Whatever the embodiment, the piston remains permanently within the cylinder; the piston may slide within and along the cylinder over a length very much less than the amplitude of the downward movement of the shaft upon dropping of the bar which it supports. Consequently, a large free flow cross-sectional area may be provided about the shaft over the major part of its length and the liquid occupying the upper internals may escape freely without braking downward movement of the bar during the major part of the movement thereof (which is desirable so that insertion of the bars can take place as rapidly as possible). The problems which guidance of the piston would raise if it had to enter the cylinder are overcome. Since the shock absorbing device is placed in the internals, it may have an appreciable length, which improves the progressivity of shock absorption, without disadvantage as regards its volume.

The hydraulic shock absorbing device which has just been described may advantageously be supplemented by a mechanical shock absorber which operates at the end of the stroke of the hydraulic shock absorbing device.

BRIEF DESCRIPTION OF THE DRAWINGS

The invention will be better understood from the following description of particular embodiments given by way of example. The description refers to the accompanying drawings.

DETAILED DESCRIPTION OF PREFERRED EMBODIMENTS

Figure 1:
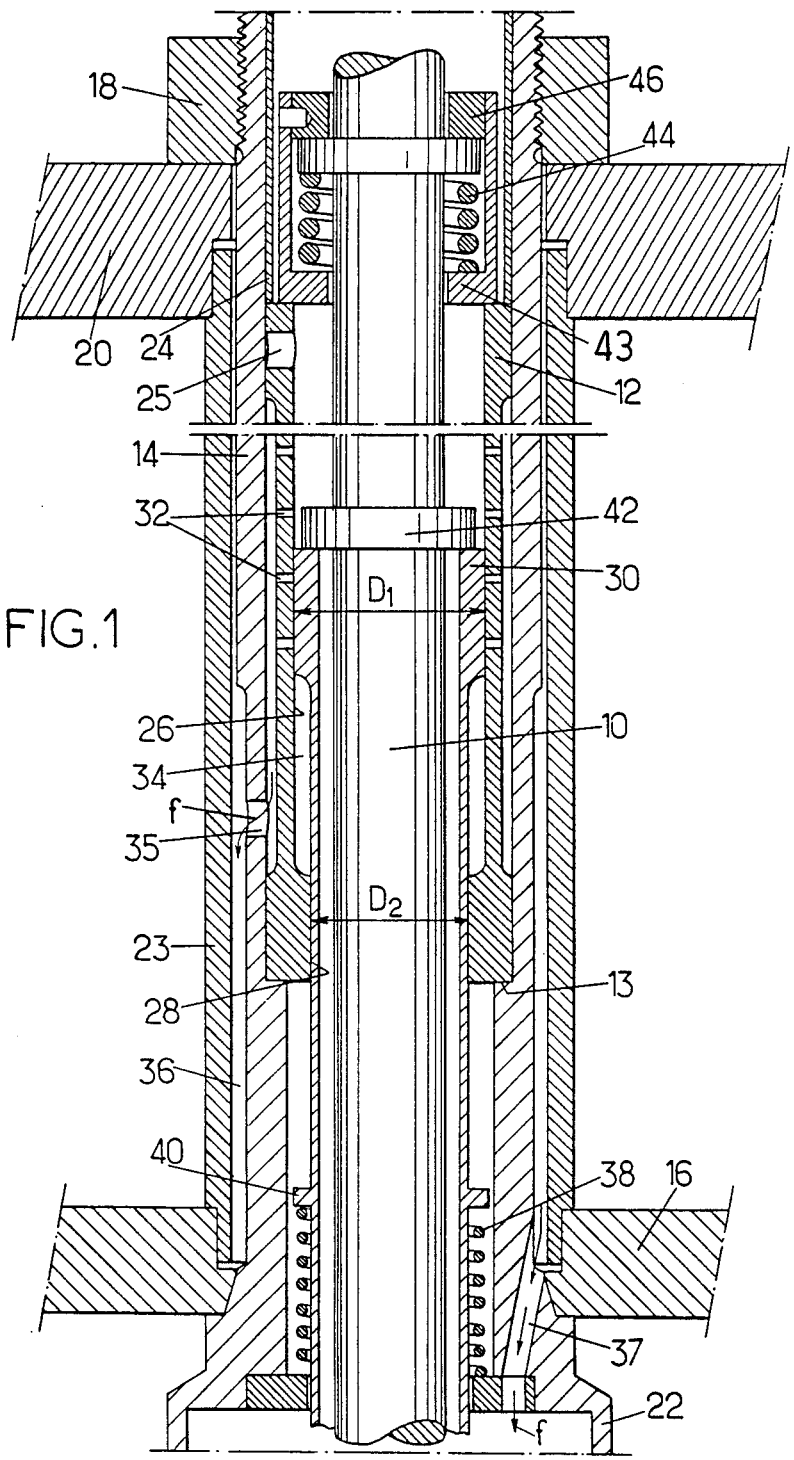
FIG. 1 is a simplified diagrammatic cross-sectional view through a vertical plane, showing the members of a control mechanism according to a first embodiment, the parts being shown in the arrangement during shock absorption and FIGS. 2 and 3, similar to FIG. 1, show modified embodiments.

The control mechanism partially shown in FIG. 1 is intended to brake the fall of a shaft 10, to which a control bar (not shown) is attached, in a pressurized water reactor. The shaft is movable vertically by a motor, typically electromagnetic, surrounding a sheath projecting above the cover of the vessel of the reactor. The latter may have any one of the constructions currently used.

As shown, the shock absorbing device comprises a cylinder 12 which is removably fixed in the upper internals of the reactor, placed above the core. The cylinder 12 has a length which is only a fraction of the height of the upper internals. It is placed inside a tubular spacer 14 and bears on a shoulder 13 of an internal bore of the spacer. Spacer 14 passes through the whole of the internals from an intermediate plate 16 on which it bears to beyond the upper plate 20. It is retained in abutment against the intermediate plate 16 by a nut 18 bearing on the upper plate 20. The tubular spacer 14 is connected to a cluster guide tube 22 extending as far as the core (not shown).

The lower edge of cylinder 12 is held against shoulder 13 of spacer 14 by a collar 24. When this collar is taken away, the cylinder may be removed, for example for maintenance purposes, with a grab engaging holes 25. A sleeve 23 connecting the plates 16 and 20 surrounds the spacer 14.

Cylinder 12 defines a stepped bore having an upper portion 26, of large diameter D1, connected to a lower portion 28, of small diameter D2 and short length. A piston 30 is mounted in the cylinder 12 and projects downward out of the cylinder. It comprises a top portion which has a sliding fit in the large diameter portion 26 and a low portion which has a sliding fit in the small diameter portion 28. The wall of the large diameter portion 26 is formed with liquid throttling holes 32 spaced apart longitudinally, progressively covered by the large diameter portion of piston 30 during the downward movement thereof. The piston and the cylinder define a chamber 34 which opens outwardly of the cylinder through holes 32 when the piston is in its top position. As soon as the piston arrives in the position in which it is shown in FIG. 1, the chamber no longer communicates with the outside except through the small clearance which exists between the piston and cylinder.

The liquid driven out of chamber 34 through the throttling holes 32 may flow towards the core along a path shown by arrows f in FIG. 1. This path comprises an annular space formed between the cylinder 12 and spacer, 14, holes 35 formed in the spacer an annular space 36 formed between the spacer 14 and sleeve 23, and holes 37 opening into the cluster guide 22.

A resetting spring 38 placed between a perforated plate fixed to spacer 14 and a flange 40 of piston 30 moves the latter, when not subjected to the shock of the shaft, back into the top position where it uncovers all the holes 32. The force exerted by spring 38 is sufficient to overcome the weight of the piston 30 but does not significantly absorb shocks.

A circumferential swelling 42 of the shaft forms a hammer and is placed at such a level that it strikes the upper edge of piston 30, then the latter is in the top position when the shaft and bar 10 fall.

The device operates as follows: when the control bar and its shaft are in top position, the resetting spring 38 holds piston 30 in an expanded position, fixed for example by abutment of flange 40 against the lower edge of the cylinder 12. Should the shaft and bar drop, hammer 42 strikes the piston and drives it into the cylinder. Downward movement of the piston is progressively braked by the throttling of the liquid which flows out from chamber 34 through holes 32 which are successively covered. At the same time, the resetting spring 38 is compressed.

As soon as the bar is lifted again, spring 38 brings the piston back into its original position.

The device may further comprise a mechanical shock absorber which comes into play at the end of the travel of the hydraulic shock absorbing device. Referring to FIG. 1, the mechanical shock absorber includes a tubular stop 43 slidable on shaft 10 and an energy absorption spring 44 which biases the stop to the low position where it is shown in FIG. 1. Downward movement of stop 42 with respect to the shaft is limited by the abutment of a collar 46 fixed to the stop against a flange of the rod.

The operation of the mechanical shock absorber is immediately clear. It comes into play when the stop 42 abuts the upper edge of cylinder 12. From this moment on, continued movement of the shaft compresses the mechanical absorption spring 44 which is, much more performing than spring 38.

In the embodiment shown in FIG. 2, piston 30a is fixed to the tubular drive shaft 10a and cylinder 12a is arranged to be suspended from the shaft until the latter, in its fall, reaches the position shown schematically in FIG. 2. For that purpose, the shaft has a shoulder 48. Resilient means maintain cylinder 12a in abutment against shoulder 48 until it engages a shoulder 49 formed in the upper internals. As shown in FIG. 2, such means comprise two springs 50 and 52 placed in series and separated by a guide 54 slidably received on the shaft. Spring 50 bears on piston 30 and spring 52 bears on an internal swelling of cylinder 12a, which slides on shaft 10a so as to define, with the latter and piston 30a, a shock absorbing chamber 34a. Chamber 34a communicates with the outside, when the piston is in its top position, through throttling holes 32a spaced apart along the cylinder.

The purpose of springs 50 and 52 is to hold the cylinder in the low position thereof, and they may consequently be very flexible. The lower portion of the bore of the cylinder may have a reduced diameter, so that guide 54 slides thereover when it arrives in the bottom position.

The device shown in FIG. 2 does not comprise a mechanical shock absorber. Such an absorber may be disposed at another location of the connection between the drive mechanism and the bar, for example inside a cluster pommel.

The operation of the device will be immediately apparent. When the control bar and the shaft fall, the cylinder is stopped by engagement on shoulder 49. The piston 30a then progressively moves into the cylinder and forces out the liquid contained in chamber 34a, which is throttled through the holes 32a.

When the drive shafts 10a is lifted, the piston alone rises during a first stage, whereas the cylinder, under the action of its weight and springs 50 and 52, remains engaged against shoulder 49. From the moment when shoulder 48 of the shaft abuts the cylinder, the latter follows the shaft in its upward movement.

The modified construction shown in FIG. 3 differs from that of FIG. 2 in that it has a mechanical shock absorber. In FIG. 3 (where the elements corresponding to those of FIG. 2 are designated by the same reference number), the resetting spring 50 is replaced with a spring 56 of relatively short length in the relaxed condition, but of high stiffness. When guide 54 is free, it is retained by the resetting spring 52 in the position shown in FIG. 3. But at the end of travel of the hydraulic shock absorber, guide 54 comes into abutment against the lower swelling of cylinder 12a. Continue downward movement of the shaft compresses spring 56 which absorbs the residual fall energy.

The device of the invention is applicable to drive mechanisms for spectrum variation as well as control bars.

The invention is susceptible of numerous modifications other than those which have been described, having for instance a cylinder of larger diameter or a different construction of the mechanical shock absorber.

I claim:

1. In a liquid cooled nuclear reactor having fixed upper internals, said upper internals having an abutment means, a drive mechanism for an absorbent bar comprising a drive shaft supporting the bar and movable vertically within said upper internals and a device for shock absorption upon fall of the shaft and bar, said device having:
- a hydraulic cylinder located in the upper internals, formed with a bore comprising an upper portion of larger diameter provided with discharge holes spaced longitudinally along the bore and with a lower portion of smaller diameter slidably receiving said shaft,
- a piston fixed to said shaft, having a sliding fit in said upper portion and defining a shock absorbing chamber with said upper portion, said lower portion and said shaft, said chamber having exhaust means comprising said discharge holes located to be progressively covered by the piston during downward movement thereof within the cylinder, and
- a resetting spring biasing said piston towards a top position where it uncovers said discharge holes,
- said cylinder and said shaft being provided with mutually cooperating seating means permitting the shaft to lift the cylinder and said abutment means of said upper internals being arranged to receive the cylinder and to retain it when the shaft, during its downward movement thereof, moves beyond a predetermined lever.

2. Device according to claim 1, wherein the resetting spring is placed between the cylinder and the piston for biasing the piston away from the smaller diameter lower portion of the cylinder.

3. Device according to claim 2, further comprising a mechanical shock absorber comprising a guide bearing on the smaller diameter lower portion of the cylinder via a resetting spring and separated from the piston by an absorption spring of high stiffness and short length as compared to the resetting spring.

* * * * *